United States Patent
Kim et al.

(10) Patent No.: US 8,416,445 B2
(45) Date of Patent: Apr. 9, 2013

(54) METHOD AND APPARATUS FOR CONNECTING IMAGE FORMING APPARATUS WITH MULTIPLE HOST DEVICES

(75) Inventors: Man-chan Kim, Suwon-si (KR); Sa-bong Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/372,768

(22) Filed: Feb. 14, 2012

(65) Prior Publication Data

US 2012/0140283 A1 Jun. 7, 2012

Related U.S. Application Data

(63) Continuation of application No. 12/098,645, filed on Apr. 7, 2008, now Pat. No. 8,139,251.

(30) Foreign Application Priority Data

Jul. 26, 2007 (KR) ................................. 2007-75113

(51) Int. Cl.
*G06F 3/12* (2006.01)
*G06K 15/00* (2006.01)

(52) U.S. Cl.
USPC .................... 358/1.15; 358/1.13; 358/1.18

(58) Field of Classification Search ........................ None
See application file for complete search history.

(56) References Cited

U.S. PATENT DOCUMENTS

| | | | | |
|---|---|---|---|---|
| 8,139,251 | B2 * | 3/2012 | Kim et al. | 358/1.15 |
| 2001/0052995 | A1 * | 12/2001 | Idehara | 358/1.15 |
| 2004/0024896 | A1 | 2/2004 | Stafford et al. | |
| 2007/0024892 | A1 * | 2/2007 | Cho | 358/1.14 |
| 2007/0024896 | A1 * | 2/2007 | Bounar | 358/1.15 |

FOREIGN PATENT DOCUMENTS

| | | |
|---|---|---|
| JP | 2005-149094 | 6/2005 |
| JP | 2006-99193 | 4/2006 |

OTHER PUBLICATIONS

Office Action, mailed Jul. 7, 2011, in corresponding U.S. Appl. No. 12/098,645 (12 pp.).
Notice of Allowance, mailed Nov. 10, 2011, in in corresponding U.S. Appl. No. 12/098,645 (8 pp.).
Office Action, mailed Sep. 6, 2011, in corresponding Chinese Application No. 200810086976.X (9 pp.).

\* cited by examiner

*Primary Examiner* — Dov Popovici
(74) *Attorney, Agent, or Firm* — Staas & Halsey LLP

(57) ABSTRACT

A method and an apparatus for connecting an image forming apparatus with multiple host devices. The method includes: displaying a user interface in which the image forming apparatus and the host devices are arranged; setting an area in the user interface in which the host devices are to be connected to the image forming apparatus; and connecting host devices positioned in the set area to the image forming apparatus.

26 Claims, 7 Drawing Sheets

FIG. 3B

| Seat : Table | | |
|---|---|---|
| Field Name | Data Type | Description |
| ID | AutoNumber | ID which is given to every Map |
| Seat-ID | Text | Seat ID |
| Map_ID | Text | Map ID |
| X | Number | Sea Position of Y axis |
| Y | Number | Sea Position of Y axis |
| Description | Text | Description of seat |

Field Properties

| General | Lookup | |
|---|---|---|
| Field Size | 50 | |
| Format | | |
| Input Mask | | |
| Caption | | |
| Default Value | | |
| Validation Rule | | |
| Validation Text | | |
| Required | No | |
| Allow Zero Length | Yes | |
| Indexed | Yes (Duplicates OK) | |
| Unicode Compression | Yes | |
| IME Mode | No Control | |
| IME Sentence Mode | None | |
| Smart Tags | | |

The field description is optional. It helps you describe the field and is also displayed in the status bar when you select this field on a form. Press F1 for help on descriptions.

FIG. 3C

| | Field Name | Data Type | Description |
|---|---|---|---|
| | ID | AutoNumber | ID which is given to every printer |
| | Model_Name | Text | Printer Model Name |
| | Caption | Text | Defined Name or Alias of Printer Driver |
| | IP_Address | Text | IP address set to the printer |
| | Map_ID | Text | Map ID |
| | Seat_ID | Text | Seat ID |
| ▲ | Set_Area | Yes/No | Yes or No to set area |
| | AreaStartX | Number | Area Starting Point of X axis |
| | AreaStartY | Number | Area Starting Point of Y axis |
| | AreaEndX | Number | Area End Point of X axis |
| | AreaEndY | Number | Area End Point of Y axis |
| | Description | Text | Description of Printer |

Map : Table — 320

322, 324, 326

Field Properties

General | Lookup
Format: Yes/No
Caption:
Default Value:
Validation Rule: No
Validation Text: No
Required:
Indexed:

The field description is optional. It helps you describe the field and is also displayed in the status bar when you select this field on a form. Press F1 for help on descriptions.

FIG. 3D

| User : Table | | |
|---|---|---|
| Field Name | Data Type | Description |
| ID | AutoNumber | ID which is given to every employee |
| Map_ID | Text | User ID |
| Caption | Text | Defined Name or Alias of User |
| IP_Address | Text | IP address set to user's computer |
| Map_ID | Text | Map ID of Seat |
| Seat_ID | Text | Seat ID of the Map |
| Description | Text | Description of User |
| Dedicated_Printer_ID | Text | Dedicated Printer |

Field Properties

General | Lookup

| | |
|---|---|
| Field Size | 50 |
| Format | |
| Input Mask | |
| Caption | |
| Default Value | |
| Validation Rule | |
| Validation Text | |
| Required | No |
| Allow Zero Length | Yes |
| Indexed | Yes (Duplicates OK) |
| Unicode Compression | Yes |
| IME Mode | No Control |
| IME Sentence Mode | None |
| Smart Tags | |

The field description is optional. It helps you describe the field and is also displayed in the status bar when you select this field on a form. Press F1 for help on descriptions.

332
334
330

METHOD AND APPARATUS FOR CONNECTING IMAGE FORMING APPARATUS WITH MULTIPLE HOST DEVICES

CROSS-REFERENCE TO RELATED APPLICATION

This application is a continuation of U.S. Ser. No. 12/098,645, filed Apr. 7, 2008 now U.S. Pat. No. 8,139,251 and claims the benefit of Korean Application No. 2007-75113, filed in the Korean Intellectual Property Office on Jul. 26, 2007, the disclosures of which are incorporated herein by reference.

BACKGROUND OF THE INVENTION

1. Field of the Invention

Aspects of the present invention relate to a method and an apparatus for connecting an image forming apparatus with multiple host devices, and more particularly, to a method and an apparatus for connecting an image forming apparatus using a universal printer driver (UPD) with multiple host devices.

2. Description of the Related Art

In general, when documents in host devices, such as personal computers (PCs), are printed by an image forming apparatus, such as a printer, someone must connect the image forming apparatuses to the host devices. Conventionally, a manager directly connects an image forming apparatus to the host devices. The burden on the manager increases as the number of host devices to be connected to an image forming apparatus increases. Also, whenever the position of the host device or the position of the image forming apparatus changes, the image forming apparatus must be re-connected with the host devices. This inconvenience greatly increases when an image forming apparatus using a universal printer driver (UPD) is connected with multiple host devices.

SUMMARY OF THE INVENTION

Aspects of the present invention provide a method and an apparatus for displaying a user interface, including arranging an image forming apparatus and host devices, setting an area for connecting the image forming apparatus with the host devices in the user interface, and connecting host devices displayed in the set area to the image forming apparatus so as to automatically connect multiple host devices to the image forming apparatus.

Additional aspects of the present invention also provide a computer-readable recording medium having embodied thereon a computer program to execute the method.

According to an aspect of the present invention, a method of connecting one or more image forming apparatuses with corresponding multiple host devices is provided. The method includes displaying a user interface in which the one or more image forming apparatuses and the host devices are arranged; setting an area in the user interface in which the host devices are to be connected to one of the one or more image forming apparatuses; and automatically connecting host devices positioned in the set area to the one image forming apparatus.

According to another aspect of the present invention, a computer-readable recording medium is provided, having embodied thereon a computer program to execute the above method.

According to another aspect of the present invention, an apparatus to connect one or more image forming apparatuses with corresponding multiple host devices is provided. The apparatus includes a display unit to display a user interface in which the one or more image forming apparatuses and the host devices are arranged; an area set unit to set an area in the user interface in which the host devices are to be connected to one of the one or more image forming apparatuses; and a connection control unit to connect host devices positioned in the set area to the one image forming apparatus.

According to a method and an apparatus to connect an image forming apparatus and multiple host devices, a user interface arranging an image forming apparatus and the host devices may be displayed. An area may be set in the user interface. The set area is an area in which the host devices are to be connected to the image forming apparatus. Host devices positioned in the set area are connected to the image forming apparatus so as to automatically connect the multiple host devices to the image forming apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3B illustrates a seat table of a map stored in a storage unit according to an embodiment of the present invention;

FIG. 3C illustrates an information table of an image forming apparatus arranged in a map stored in a storage unit according to an embodiment of the present invention;

FIG. 3D illustrates an information table of a host device arranged in a map stored in a storage unit according to an embodiment of the present invention.

DETAILED DESCRIPTION OF THE EMBODIMENTS

Figure 1:
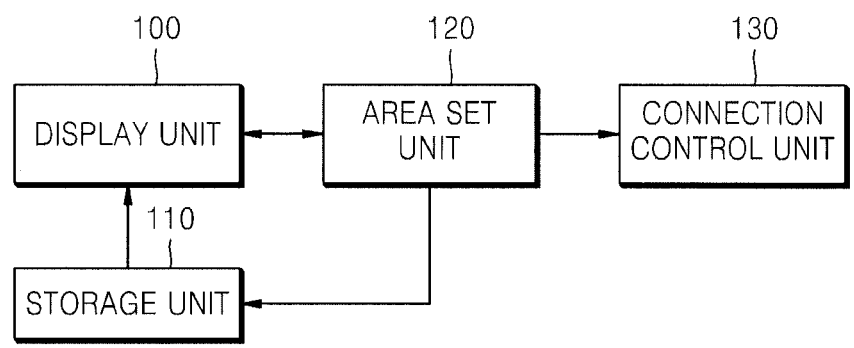
FIG. 1 is a block diagram of an apparatus for connecting an image forming apparatus with multiple host devices according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus to connect an image forming apparatus with multiple host devices, according to an embodiment of the present invention. The apparatus includes a display unit 100, a storage unit 110, an area set unit 120, and a connection control unit 130. The image forming apparatus connected with the multiple host devices may use a universal printer driver (UPD). According to other aspects of the invention, the apparatus may include additional and/or different units. Similarly, the functionality of one or more of the above units may be combined into a single component. The apparatus as described above may be incorporated into a host device, a server device, an image forming apparatus, or any device connected to a network. The various units may also be located on different devices in the network; for example, the display unit 100 may be located at a host device and the storage unit 110 may be located at a server.

Figure 2:
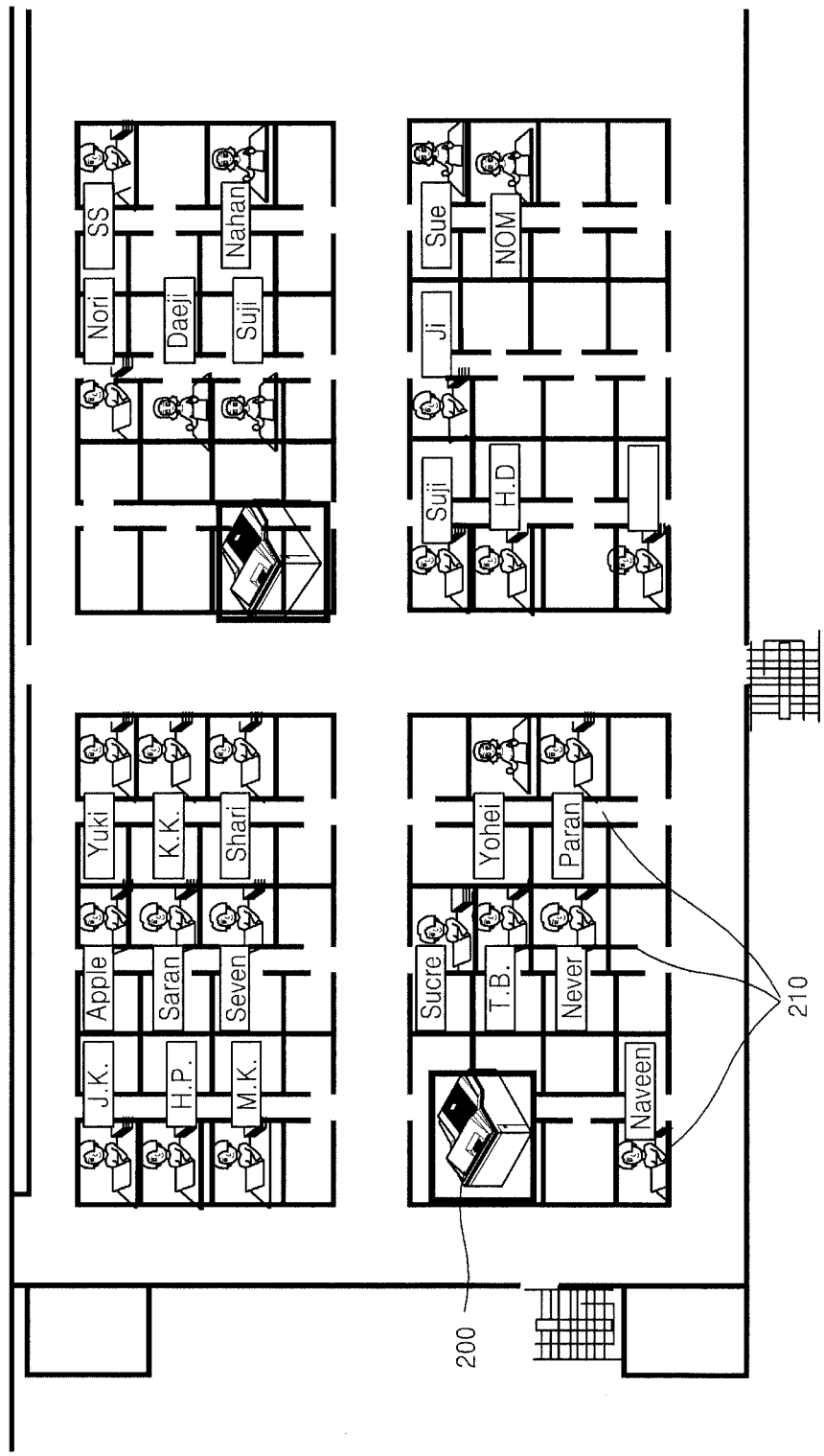
FIG. 2 illustrates a map into which a user interface is formed, according to an embodiment of the present invention.

The display unit 100 displays a user interface formed into a map indicating a space in which the image forming apparatus and the multiple host devices are arranged. FIG. 2 shows a map forming a user interface according to an embodiment of the present invention. The map indicates a space in which an image forming apparatus 200 and multiple host devices 210 are arranged. The map shows the image forming apparatus 200 and the multiple host devices 210 as icons. A position in which an image forming apparatus and host devices are arranged can be checked through the user interface displayed on the display unit 100.

The storage unit 110 stores information regarding the map, seats in the map, the image forming apparatus, and the host devices. The information may be stored in a table format. The information stored in the storage unit 110 will be described in detail with reference to FIGS. 3A through 3D.

Figure 3A:
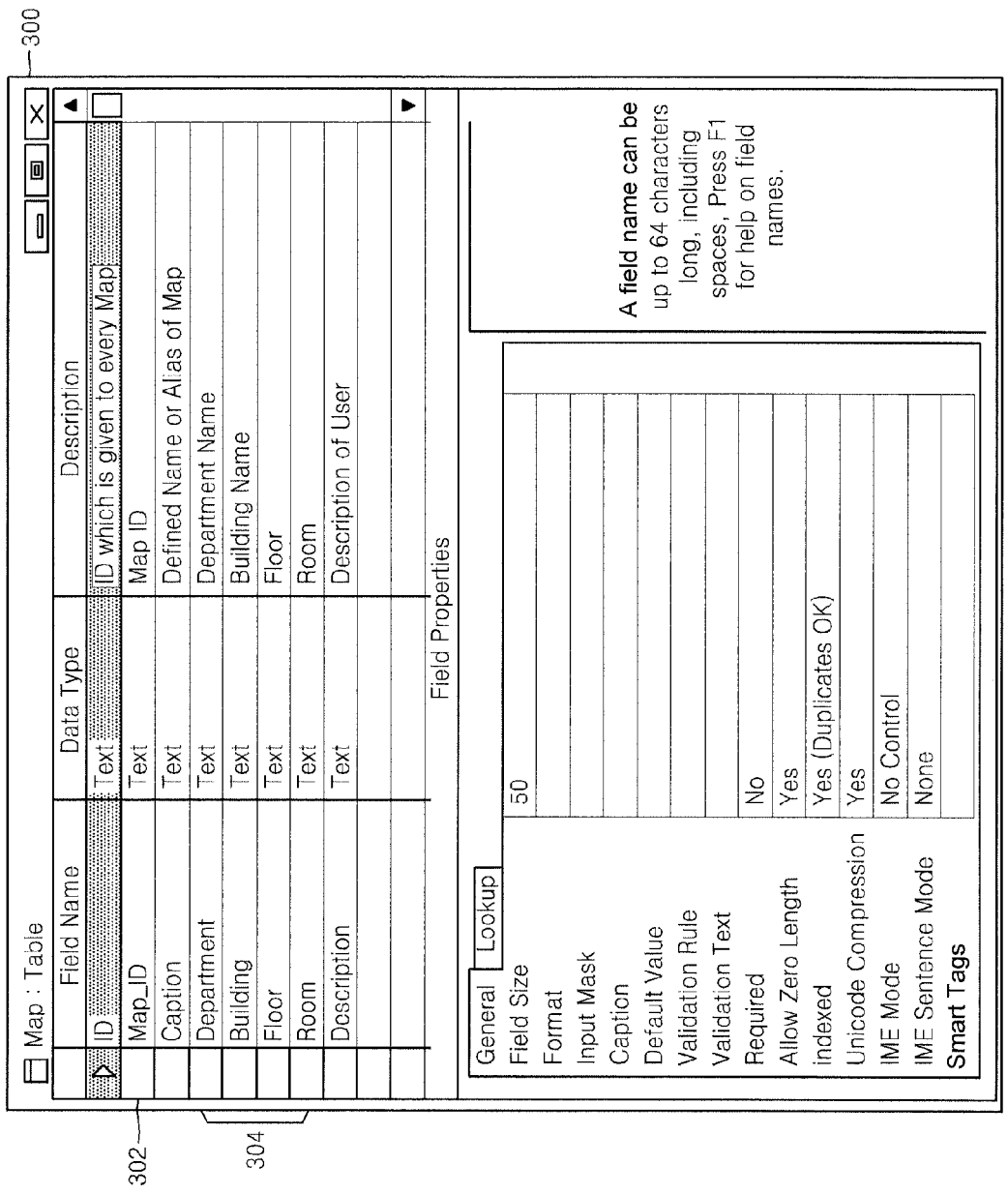
FIG. 3A illustrates a map table stored in a storage unit according to an embodiment of the present invention.

FIG. 3A shows a map table stored in a storage unit according to an embodiment of the present invention. The map forming the user interface represents the space in which the image forming apparatus and the host devices are arranged. The space may be, for example, expressed as an office in a building. A map table 300 includes a map identification (ID) 302 and information 304 regarding the map, such as information regarding a building, a department, a floor, a room, etc., in which the map is positioned.

FIG. 3B shows a seat table 310 of a map stored in a storage unit according to an embodiment of the present invention. As shown in FIG. 2, the map indicates an office in a building and thus generally includes a plurality of seats. The seats indicate positions in which image forming apparatuses or host devices may be arranged. The seat table 310, as shown in FIG. 3B, includes a seat ID 312 identifying seats, a map ID 314 including the seats, and position information 316 of the seats based on the map. The position information 316 of the seats may be expressed with coordinate values X and Y of a position of the map in which the seats are arranged.

FIG. 3C shows an information table 320 of an image forming apparatus arranged in a map stored in a storage unit according to an embodiment of the present invention. The image forming apparatus is arranged in one of the seats of FIG. 3B of the map of FIG. 3A. The information table 320 of the image forming apparatus includes a map ID 322 and a seat ID 324 in which the image forming apparatus is arranged. If an arrangement position of the image forming apparatus changes, the information table 320 of the image forming apparatus is updated with the seat ID 324 corresponding to the changed arrangement position. The information table 320 may always include the seat ID 324 corresponding to the arrangement position of the image forming apparatus.

The information table 320 further includes position information 326 regarding areas of the map in which host devices may be connected to the image forming apparatus. The position information 326 is generated when the areas are set through a user interface.

FIG. 3D shows an information table of a host device arranged in a map stored in a storage unit according to an embodiment of the present invention. The host device is arranged in one of the seats of FIG. 3B of the map of FIG. 3A. The information table 330 of the host device includes a map ID 332 and a seat ID 334 in which an image forming apparatus is arranged. If an arrangement position of the host device changes, the information table 330 is updated with the seat ID 334 corresponding to the changed arrangement position. The information table 330 may always include the seat ID 334 corresponding to the arrangement position.

Referring again to FIG. 1, the area set unit 120 sets an area in the user interface formed into the map indicating the space in which the image forming apparatus and the host devices are arranged. The area indicates an area in which the host devices are to be connected to the image forming apparatus and may be set using an input device, such as a mouse. If the mouse is used, the mouse is dragged on the map shown in FIG. 2 to designate an area in which the host devices are to be connected to the image forming apparatus. A touch screen, a keyboard, or the like may also be used instead of, or in addition to, the mouse. If the area is designated in the user interface through the mouse, the area set unit 120 sets the designated area as the area in which the host devices are to be connected to the image forming apparatus.

The area set unit 120 obtains coordinate values of the area designated by the mouse and sets a range of the coordinate values as the area in which the host devices are to be connected to the image forming apparatus. Information regarding the area set by the area set unit 120 is stored in the information table 320 of the image forming apparatus stored in the storage unit 110. Whenever a position of the image forming apparatus changes, the area set unit 120 re-sets an area in which the host devices are to be connected to the image forming apparatus. In addition, whenever positions of the host devices change, the area set unit 120 re-sets an area in which the host devices are to be connected to the image forming apparatus.

The connection control unit 130 connects host devices positioned in the area set by the area set unit 120 to the image forming apparatus. The seat ID 334 in which the host devices are arranged is written in the information table 330 of the host device stored in the information table 330. Coordinate values corresponding to a position of the seat ID 334 are set in the seat ID 334. The range of the area set by the area set unit 120 is written as coordinate values in the information table 320 of the image forming apparatus stored in the storage unit 110. The connection control unit 130 compares coordinate values to determine whether the host devices are positioned within the range of the area written in the information table 320 of the image forming apparatus. If the host devices are positioned within the range, the connection controller 130 connects the host devices positioned within the range to the image forming apparatus. As described above, the connection controller 130 may compare the coordinate values of the host devices with the coordinate values of the set area to automatically connect the host devices corresponding to the coordinate values positioned within the set area to the image forming apparatus.

If the positions of the host devices change, the seat ID 334 indicating position information of the host devices is changed in the information table 330 corresponding to the host device. The connection control unit 130 determines whether the host devices are positioned within the range of the set area based on coordinate values of the changed seat ID 334 so as to connect the host devices positioned within the range to the image forming apparatus. Even if the position of the image forming apparatus changes, the connection control unit 130 automatically connects the host devices to the image forming apparatus.

If the area set by the area set unit 120 overlaps with an area in which the host devices are to be connected to another image forming apparatus, the connection controller 130 connects host devices positioned in the overlapped area to at least one of the two image forming apparatuses. An image forming apparatus to be connected with the host devices may be determined according to designated or pre-set options of a user. If options for a high-speed printer, a digital copier, a color printer, a duplex printer, etc., are set, the connection controller 130 connects the host devices positioned in the overlapped area to an image forming apparatus satisfying the set options. The image forming apparatus may be set based on other criteria as well. Accordingly, the connection control unit 130 connects the host devices to the image forming apparatus whenever the area set by the area set unit 120 or the coordinate values of the position of the host device stored in the storage unit 110 changes.

Figure 4:
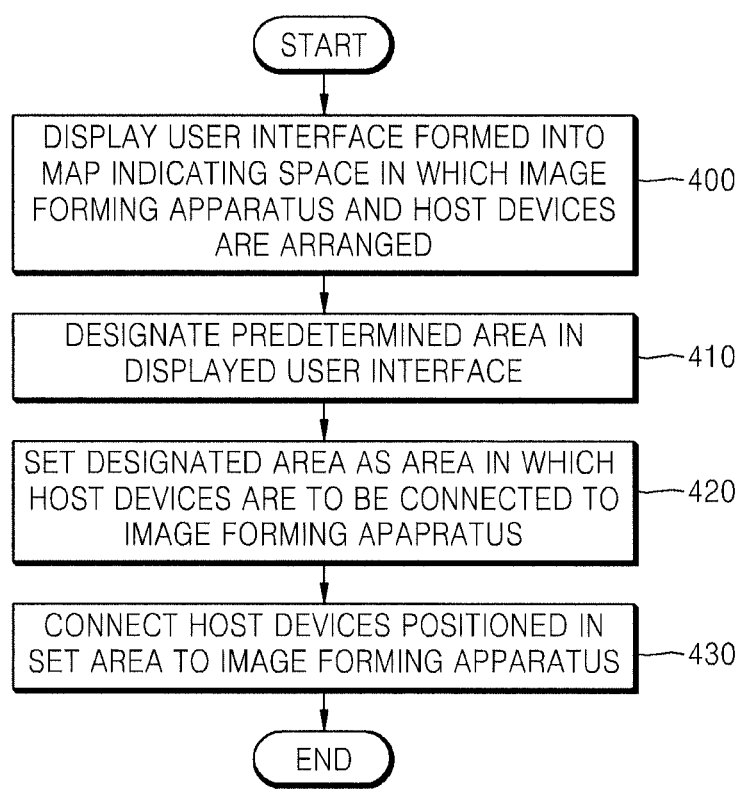
FIG. 4 is a flowchart of a method of connecting an image forming apparatus with multiple host devices according to an embodiment of the present invention.

FIG. 4 is a flowchart of a process of connecting an image forming apparatus with multiple host devices according to an embodiment of the present invention. The process will be described with reference to the apparatus of FIG. 1, the map of FIG. 2, and the tables of FIGS. 3A through 3D. In the present preferred embodiment, the apparatus may use the UPD.

In operation 400, a user interface formed into a map is displayed. The map indicates a space in which an image forming apparatus and host devices are arranged. As shown in FIG. 2, the map forming the user interface indicates a space in which an image forming apparatus and multiple hosts are arranged and arrangement positions of the image forming apparatus and the host devices in the space. The arrangement positions of the image forming apparatus and the host devices can be checked through the user interface.

In operation 410, a predetermined area is designated in the displayed user interface. The predetermined area may be designated as an area in which the host devices are to be connected to the image forming apparatus, using an input device such as a mouse, a touch screen, a keyboard, etc. If the mouse is used, the mouse may be dragged on the user interface formed into the map of FIG. 2 to designate the area in which the host devices are to be connected to the image forming apparatus. Whenever the arrangement position of the image forming apparatus or the arrangement positions of the host devices changes, a predetermined area is newly designated in the user interface.

In operation 420, the designated area is set to an area in which the host devices are to be connected to the image forming apparatus. Coordinate values of the area designated in operation 410 are obtained based on the map forming the user interface, and an area positioned within a range of the coordinate values is set to an area in which the host devices are to be connected to the image forming apparatus. If a predetermined area is re-designated due to the change of the arrangement position of the image forming apparatus, the re-designated area is set to an area in which the host devices are to be connected to the image forming apparatus.

In operation 430, host devices positioned in the set area are connected to the image forming apparatus. The apparatus for connecting the image forming apparatus with the multiple host devices may store information regarding the map, seats of the map, the image forming apparatus, and the multiple host devices in a storage unit. The information may be stored in table formats as shown in FIGS. 3A through 3D. As shown in FIG. 3D, the seat ID 334 in which the host devices are arranged is written in the information table 330 of the host device, and the coordinate values of the seat ID 334 corresponding to the position of the seat ID 334 are set. As shown in FIG. 3C, the range of the area set in operation 420 is written as coordinate values in the information table 320 of the image forming apparatus. The coordinate values may be compared so as to determine whether host devices are positioned within the range of the area written in the information table 320. If the host devices are positioned within the range, the host devices positioned within the range of the set area are connected to the image forming apparatus. As described above, coordinate values of the host devices are compared with the coordinate values of the set area so as to automatically connect host devices corresponding to the coordinate values positioned within the area to the image forming apparatus.

If the coordinate values of the host devices change due to the change of the arrangement position of the image forming apparatus, the changed coordinate values of the host devices are compared with the coordinate values of the set area to automatically connect host devices corresponding to coordinate values positioned within the set area to the image forming apparatus. Although the arrangement positions of the host devices are changed, the host devices may be always connected to the image forming apparatus.

If the area set in operation 420 overlaps with an area in which the host devices are to be connected to another image forming apparatus, host devices positioned in the overlapped area are connected to at least one of the two image forming apparatuses. An image forming apparatus to be connected with the host devices may be determined according to designated or pre-set options of a user. If options of a high-speed printer, a digital copier, a color printer, a duplex printer, etc. are set, then the host devices positioned in the overlapped area are connected to an image forming apparatus satisfying the set options.

Aspects of the present invention can also be embodied as computer readable codes on a computer readable recording medium. The computer readable recording medium may be any data storage device that can store data which can be thereafter read by a computer system. Examples of the computer readable recording medium also include read-only memory (ROM), random-access memory (RAM), CD-ROMs, magnetic tapes, floppy disks, optical data storage devices, and DVDs. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of connecting one or more image forming apparatuses with corresponding multiple host devices, comprising:

displaying a user interface in which the one or more image forming apparatuses and the host devices are arranged as icons;

designating a predetermined area in the user interface;

setting the designated area to an area in the user interface in which the host devices are to be connected to one of the one or more image forming apparatuses; and connecting host devices positioned in the set area to the one image forming apparatus according to a user's designation.

2. The method of claim 1, further comprising displaying the arrangement of the one or more image forming apparatuses and the host devices as a map in the user interface.

3. The method of claim 1, further comprising storing coordinate values of positions of the host devices and coordinate values of the set area.

4. The method of claim 3, further comprising updating the coordinate values of host devices having changed positions as changed coordinate values.

5. The method of claim 1, further comprising resetting the set area in the user interface whenever a position of one of the one or more image forming apparatuses changes.

6. The method of claim 5, further comprising, if the set area changes, connecting host devices positioned in the changed area to the one image forming apparatus.

7. The method of claim 1, further comprising:
setting the set area whenever the positions of the host devices change; and
if the set area changes, connecting host devices positioned in the changed area to the one image forming apparatus.

8. The method of claim 7, further comprising, if the changed area overlaps with an area in which the host devices are to be connected to a second image forming apparatus, connecting host devices positioned in the overlapped area to at least one of the one image forming apparatus and the second image forming apparatus.

9. The method of claim 8, further comprising:
determining one of the one or more image forming apparatuses to be connected with the host devices according to designated or pre-set options of a user; and
connecting the host devices to the determined image forming apparatus.

10. A non-transitory computer-readable recording medium having embodied thereon a computer program for executing the method of claim 1.

11. The method of claim 1, wherein the setting of the set area in the user interface comprises setting the set area in the user interface based on a user dragging.

12. An apparatus to connect one or more image forming apparatuses with corresponding multiple host devices, comprising:
a display unit to display a user interface in which the one or more image forming apparatuses and the host devices are arranged as icons;
an area set unit to set an area in the user interface in which the host devices are to be connected to one of the one or more image forming apparatuses;
a storage unit to store coordinate values of arrangement positions of the host devices and coordinate values of the set area; and
a connection control unit to connect host devices corresponding to coordinate values positioned within a range of the coordinate values of the set area to the one image forming apparatus according to a user's designation.

13. The apparatus of claim 12, wherein the arrangement of the one or more image forming apparatuses and the host devices is displayed as a map in the user interface.

14. The apparatus of claim 12, wherein the area set unit set the set area in the user interface based on a user dragging.

15. The apparatus of claim 12, wherein, if any of the host devices have changed positions, the storage unit updates the coordinate values of the host devices having the changed positions as changed coordinate values.

16. The apparatus of claim 12, wherein, whenever a position of the one image forming apparatus changes, the area set unit re-sets an area in the user interface in which the host devices are to be connected to the one image forming apparatus.

17. The apparatus of claim 12, wherein, whenever the set area or the coordinate values of the arrangement positions of the host devices changes, the connection control unit connects the host devices to the one image forming apparatus.

18. The apparatus of claim 17, wherein, if the changed area overlaps with an area in which the host devices are to be connected to a second image forming apparatus, the connection control unit connects host devices positioned in the overlapped area to at least one of the one image forming apparatus and the second image forming apparatus.

19. The apparatus of claim 18, wherein the connection control unit determines one of the one or more image forming apparatuses to be connected with the host devices according to designated or pre-set options of a user and connects the host devices to the determined image forming apparatus.

20. An apparatus to connect one or more image forming apparatuses to a plurality of host devices, the apparatus comprising:
an area set unit to set an area of a display unit in which the plurality of host devices are to be connected to one of the one or more image forming apparatuses and to re-set a new area of the display unit if a position of the one or more image forming apparatuses or a position of one or more of the host devices changes; and
a connection control unit to connect host devices located in the set area to one of the one or more image forming apparatuses, and to re-connect host devices located in the new area to an image forming apparatus corresponding to the new area according to a user's designation.

21. The apparatus of claim 20, further comprising:
the display unit to display a user interface so as to allow a user to designate the area to be set by the area set unit.

22. The apparatus of claim 20, further comprising:
a storage unit to store the set area as a map including coordinate values of positions of the host devices located in the set area and the position of the one image forming apparatus.

23. The apparatus of claim 21, wherein:
if a position of one of the host devices change, the connection control unit updates coordinate values of the map corresponding to the changed position of the one of the host devices; and
if a position of one of the one or more image forming apparatuses changes, the connection control unit updates coordinate values of the map corresponding to the changed position of the one of the one or more image forming apparatuses.

24. The apparatus of claim 21, wherein the storage unit stores map table corresponding to the map and including a map identification identifying the map and information about the map.

25. The apparatus of claim 24, wherein the storage unit stores a seat table comprising positions in the map and including a seat identification identifying seats, a map identification identifying the map to which the seats correspond, and position information of the seats including coordinate values of the seats.

26. The apparatus of claim 21, wherein the area set unit set the set area in the user interface based on a user dragging.

* * * * *